United States Patent
Kolhatkar et al.

(10) Patent No.: US 11,056,884 B2
(45) Date of Patent: Jul. 6, 2021

(54) WIND TURBINE SYSTEM WITH INTEGRATED REACTIVE POWER COMPENSATION DEVICE

(71) Applicant: General Electric Company, Schenectady, NY (US)

(72) Inventors: Yashomani Yashodhan Kolhatkar, Bangalore (IN); Olive Ray, Kolkata (IN); Kasi Viswanadha Raju Gadiraju, Bangalore (IN); Arvind Kumar Tiwari, Bangalore (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/403,814

(22) Filed: May 6, 2019

(65) Prior Publication Data

US 2020/0358289 A1 Nov. 12, 2020

(51) Int. Cl.
*H02J 3/18* (2006.01)
*F03D 7/02* (2006.01)
(Continued)

(52) U.S. Cl.
CPC ............ *H02J 3/1892* (2013.01); *F03D 7/028* (2013.01); *F03D 9/255* (2017.02); *F03D 80/60* (2016.05); *H02K 7/1838* (2013.01); *H02K 9/00* (2013.01); *H02M 5/4585* (2013.01); *H02P 9/007* (2013.01); *H02P 9/02* (2013.01); *F05B 2260/20* (2013.01); *F05B 2270/337* (2013.01)

(58) Field of Classification Search
CPC ........ H02J 3/1892; F03D 80/60; F03D 9/255; F03D 7/028; H02K 7/1838; H02K 9/00; H02M 5/4585; H02P 9/007; H02P 9/02; F05B 2260/20; F05B 2270/337
See application file for complete search history.

(56) References Cited

U.S. PATENT DOCUMENTS 904,607 A 11/1908 Elmblad
6,924,565 B2 8/2005 Wilkins et al.
(Continued)

FOREIGN PATENT DOCUMENTS

CN 106451483 A 2/2017
CN 107240930 A 10/2017
WO WO2014/044007 A1 3/2014

OTHER PUBLICATIONS

EPO Search Report, dated Jun. 25, 2020.
(Continued)

*Primary Examiner* — Tulsidas C Patel
*Assistant Examiner* — Joseph Ortega
(74) *Attorney, Agent, or Firm* — Dority & Manning, P.A.

(57) ABSTRACT

A wind turbine system is configured to supply real and reactive power to a grid and includes a tower, and a generator within a nacelle configured atop the tower. The generator is connected to a rotor, which is connected to a hub that includes a plurality of turbine blades mounted thereon. A power converter is configured at a location within the tower. A reactive power compensation device is also configured at the location within the tower, the reactive power compensation device operably configured with the power converter so as to provide reactive power in combination with reactive power generated by the power converter.

10 Claims, 5 Drawing Sheets

(51) Int. Cl.
*F03D 80/60* (2016.01)
*F03D 9/25* (2016.01)
*H02K 7/18* (2006.01)
*H02K 9/00* (2006.01)
*H02M 5/458* (2006.01)
*H02P 9/00* (2006.01)
*H02P 9/02* (2006.01)

(56) References Cited

U.S. PATENT DOCUMENTS

| | | | |
|---|---|---|---|
| 7,013,203 B2 | 3/2006 | Moore et al. | |
| 7,071,579 B2 | 7/2006 | Erdman et al. | |
| 7,095,597 B1 | 8/2006 | Cousineau | |
| 7,166,928 B2 | 1/2007 | Larsen | |
| 7,168,251 B1 * | 1/2007 | Janssen | F03D 80/60 |
| | | | 60/641.1 |
| 7,245,037 B2 | 7/2007 | Angquist et al. | |
| 7,567,160 B2 | 7/2009 | Folts et al. | |
| 7,605,487 B2 | 10/2009 | Barton et al. | |
| 7,748,946 B2 * | 7/2010 | Wan | F03D 13/20 |
| | | | 415/1 |
| 7,923,862 B2 | 4/2011 | Cardinal et al. | |
| 8,058,742 B2 * | 11/2011 | Erdman | F03D 9/25 |
| | | | 290/55 |
| 8,653,685 B2 | 2/2014 | Garcia | |
| 8,664,800 B2 | 3/2014 | Galbraith et al. | |
| 8,847,562 B2 | 9/2014 | Agudo Araque | |
| 8,853,876 B1 | 10/2014 | Wagoner et al. | |
| 9,214,883 B2 | 12/2015 | Kim et al. | |
| 9,236,742 B2 | 1/2016 | Garcia | |
| 9,366,233 B2 | 6/2016 | Bech et al. | |
| 9,407,186 B2 | 8/2016 | Babazadeh et al. | |
| 9,419,439 B2 | 8/2016 | Nielsen | |
| 9,458,831 B2 | 10/2016 | Ubben et al. | |
| 9,556,852 B2 | 1/2017 | Babazadeh et al. | |
| 9,556,853 B2 | 1/2017 | Gupta et al. | |
| 9,625,921 B2 | 4/2017 | Smith et al. | |
| 9,660,448 B2 | 5/2017 | Ellena et al. | |
| 2010/0332040 A1 | 12/2010 | Garcia | |
| 2014/0175887 A1 | 6/2014 | Shao et al. | |
| 2016/0268940 A1 | 9/2016 | Achilles et al. | |
| 2016/0322821 A1 | 11/2016 | Saboor et al. | |
| 2017/0025858 A1 * | 1/2017 | Garcia | H02J 3/46 |
| 2017/0064863 A1 * | 3/2017 | Zeng | H05K 5/0213 |
| 2018/0323618 A1 | 11/2018 | Wagoner et al. | |

OTHER PUBLICATIONS

Kihwele, On Control and Operating Strategies for Maximizing the Controllability of the DFIG Wind Turbine During Grid Disturbance, 2016 International Conference on Electronics, Information, and Communications (ICEIC), Da Nang, Vietnam, 2016, pp. 1-4. (Abstract Only).

Qui et al., Modeling and Control of a Wind-turbine-drive DFIG During Grid Voltage Dips Based on DlgSILENT/PowerFactory, 2015 18th International Conference on Electrical Machines and Systems (ICEMS), Pattaya, Thailand, 2015, pp. 1831-1835. (Abstract Only).

Ling et al., Dynamic Reactive Power Compensation During Fault Conditions for Wind Farms with the Consideration of Wind Turbine Protection Effects, International Conference on Sustainable Power Generation and Supply (SUPERGEN2012), Sep. 8-9, 2012, Hangzhou, China, 5 Pages.

Liu et al., Research on Effects of Wind Turbines Characteristics on Power Grid Stability, Paper No. CP0459, 2014 China International Conference on Electricity Distribution (CICED 2014), Shenzhen, China, Sep. 23-26, 2014, pp. 637-639.

Lei et al., Modeling of the Wind Turbine With a Doubly Fed Induction Generator for Grid Integration Studies, IEEE Transactions on Energy Conversion, vol. 21, No. 1, Mar. 2006, pp. 257-264.

Bhukya et al., The Controlling of the DFIG Based on Variable Speed Wind Turbine Modeling and Simulation, 2016 IEEE 6th International Conference on Power Systems (ICPS), IEEE Explore, New Delhi, India, Mar. 4-6, 2016, 6 Pages.

* cited by examiner

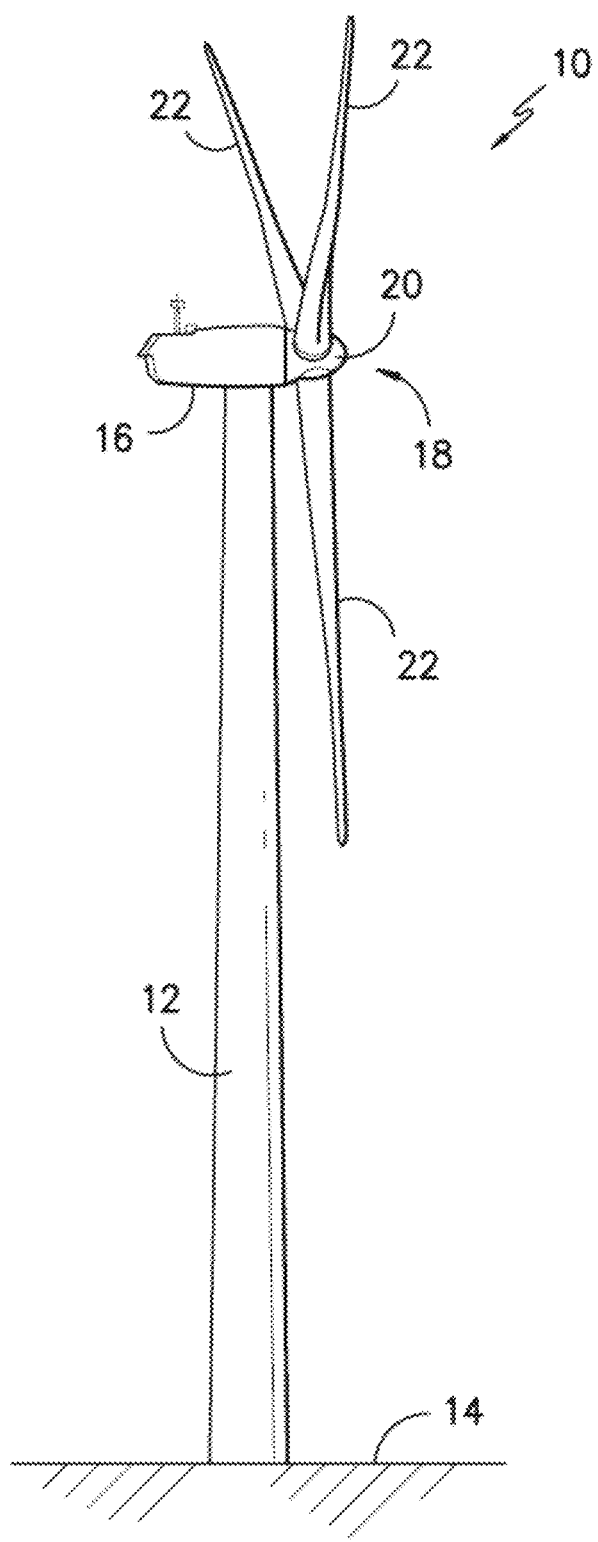
FIG. -1-

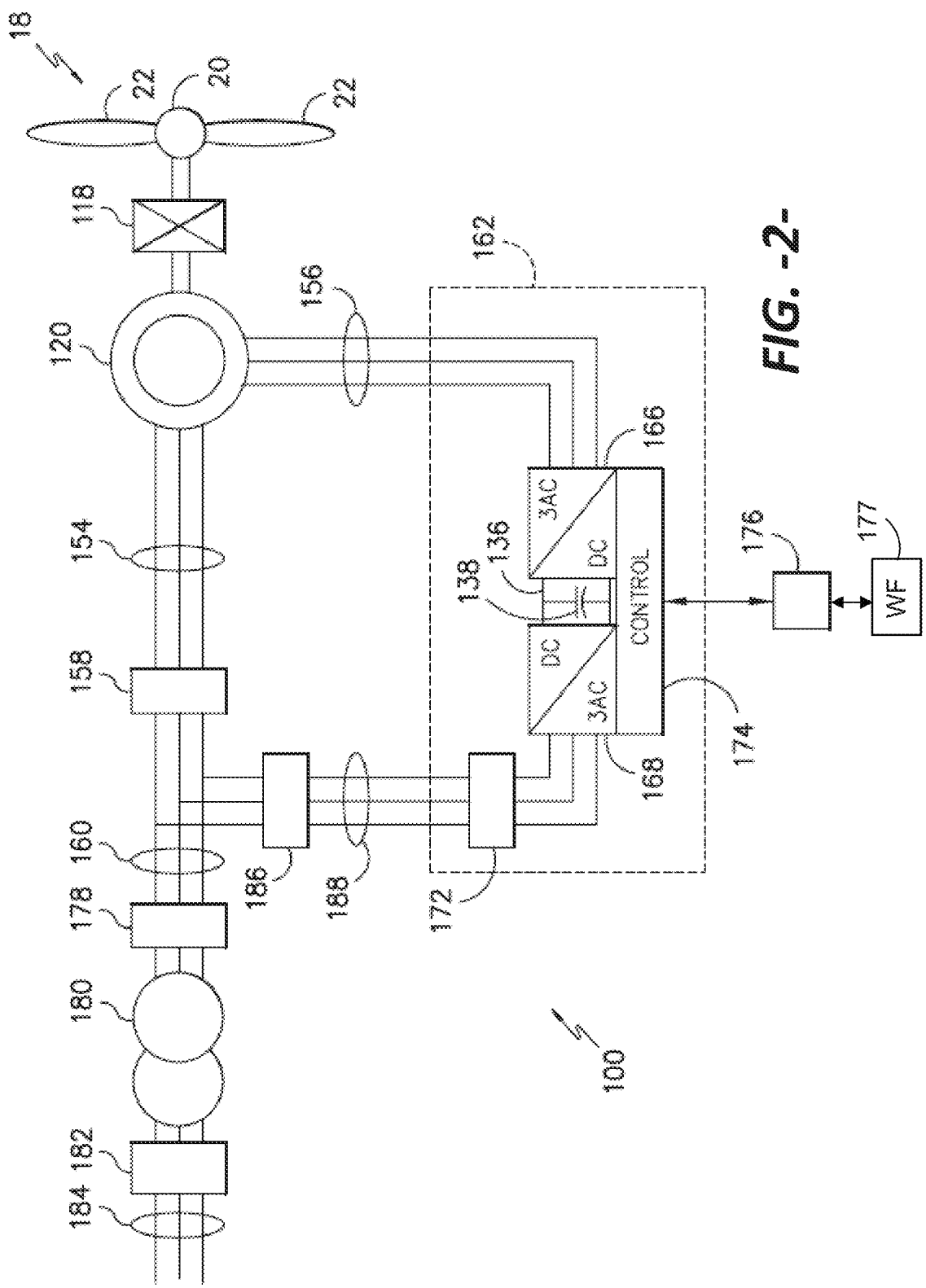
FIG. -2-

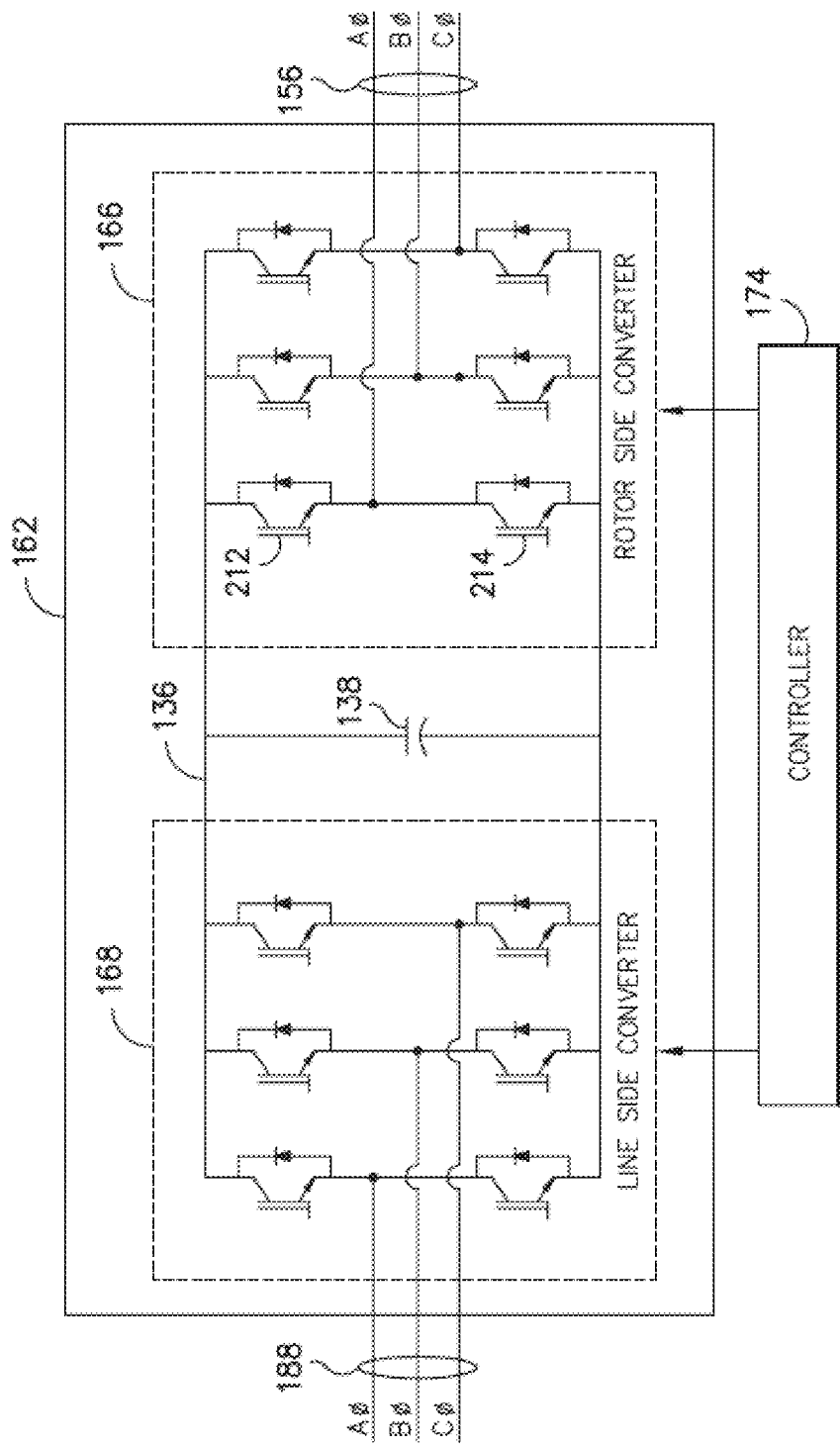
FIG. -3-

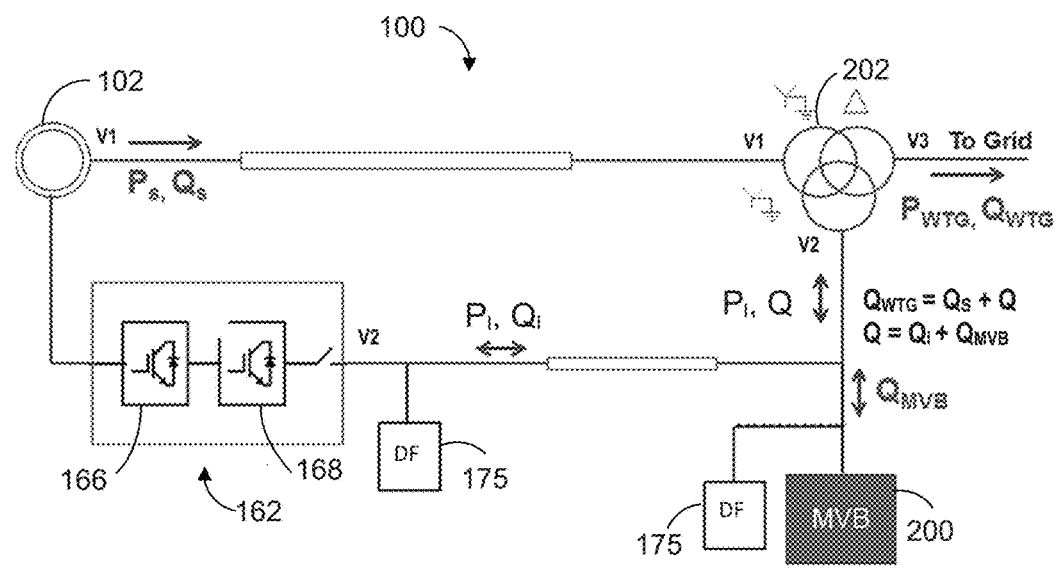
FIG. -4-
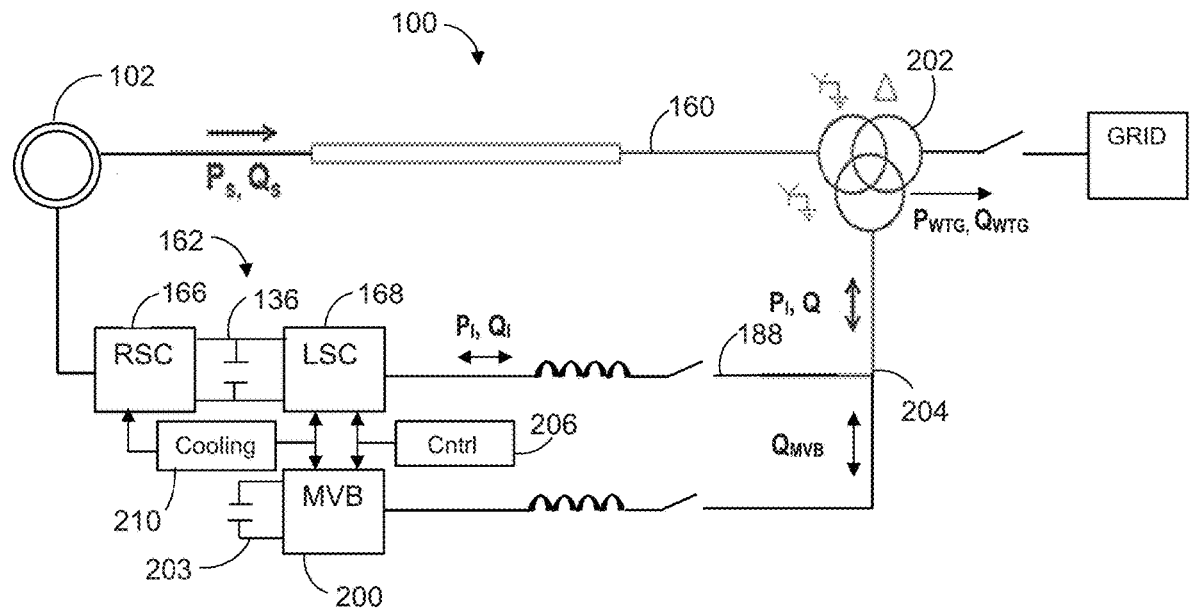
FIG. -5-

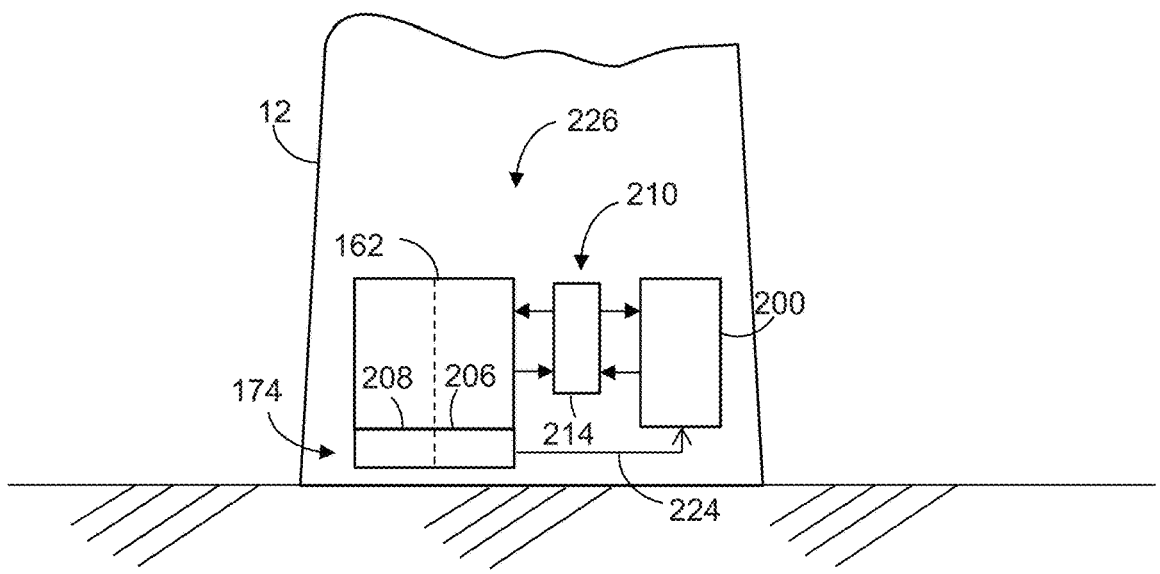
*FIG. -6-*
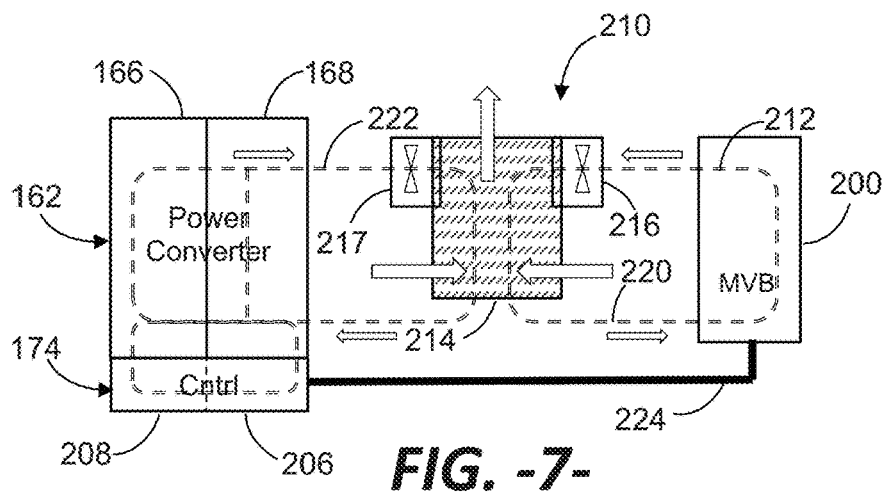
*FIG. -7-*
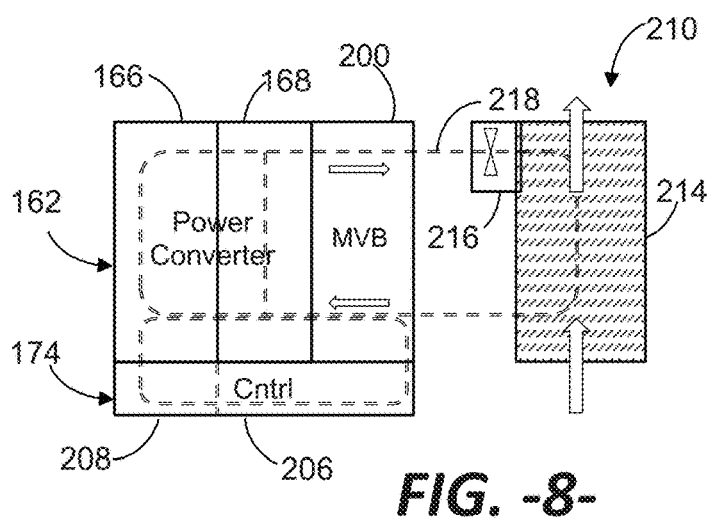
*FIG. -8-*

WIND TURBINE SYSTEM WITH INTEGRATED REACTIVE POWER COMPENSATION DEVICE

FIELD

The present disclosure relates generally to power generating systems, and, more particularly, to a system and method for coordinated control of various sources of reactive power in a wind turbine system.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient conditions is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

It is known to augment the reactive power capability of a wind farm by use of reactive power compensation devices, such as Static VAR compensator (SVC) or Static VAR Generator (SVG) devices, at one or more common collector buses shared by the wind turbines. For example, US Patent Application Pub. No. 2017/0025858 describes a wind power plant connected to an electrical grid, the power plant including a plurality of wind turbine generators and a Static Synchronous Compensator (STATCOM) device on a common bus with the wind turbine generators.

Conventional system configurations that utilize a common reactive power compensation device require a dedicated controller for the device, as well as temperature and other environmental control systems, which can add significantly to the overall cost of the wind farm.

An improved system and method that integrates an auxiliary reactive power source at a local level within the wind turbine and minimizes duplication of control and cooling functionalities would be desirable in the industry.

BRIEF DESCRIPTION

Aspects and advantages of the invention will be set forth in part in the following description, or may be obvious from the description, or may be learned through practice of the invention.

In one aspect, the present disclosure is directed to a wind turbine system configured to supply real and reactive power to a grid, wherein the wind turbine system includes a tower, and a generator within a nacelle configured atop the tower. The generator is connected to a rotor, which is connected to a hub having a plurality of turbine blades mounted thereon. A power converter is configured at a location within the tower, such as an up-tower (e.g. closer to the nacelle) or down-tower location (e.g. at or near ground level within the tower). A dedicated reactive power compensation device is also configured at the down-tower location within the tower, wherein the reactive power compensation device is operably configured with the power converter to provide reactive power in combination with reactive power generated by the power converter.

In a certain embodiment, a common controller may be configured with the reactive power compensation device and the power converter.

The power converter and the reactive power compensation device may be configured at a common side of a main breaker in a system bus that connects the generator to the grid.

In another embodiment, the wind turbine system may further include a cooling system that is common to the power converter and the reactive power compensation device. This embodiment may also include a controller that is common to the power converter and the reactive power compensation device.

In a particular embodiment, the generator is a doubly fed induction generator (DFIG), and the power converter includes a line side converter (LSC) and a rotor side converter (RSC). The DFIG generates a generator stator-side reactive power (Qs) via the RSC and the LSC generates a generator liner-side reactive power (Ql). The reactive power compensation device generates reactive power (Qmvb) that combines with (Ql) such that a total reactive power generated by the wind turbine system (Qwtg) is a total of (Qs), (Ql), and (Qmvb). In this embodiment, the reactive power compensation device may be connected with the LSC at a connection point on a bus, such as the line-side bus. Also with this embodiment, a system bus that includes a main breaker may connect the DFIG to the grid, wherein the compensation device and the power converter on a common side of the main breaker.

In the DFIG embodiment, the wind turbine system may also include a power converter controller having a LSC controller and a RSC controller, wherein the LSC controller is also configured with the reactive power compensation device to control the operation thereof.

In still another embodiment, the wind turbine system may include a cooling system configured to provide a cooling medium to the power converter and the reactive power compensation device. For example, in one embodiment, the cooling system may include a heat exchanger, wherein the reactive power compensation device and the power converter are arranged in a common closed-loop cooling path with the heat exchanger. One or both of the LSC and the RSC may be arranged in the closed-loop cooling path.

For example, the reactive power compensation device may be arranged in a first closed-loop cooling path with the heat exchanger, and the LSC may be arranged in a separate, second closed-loop cooling path. The RSC may also be arranged in the second closed-loop cooling path.

Reactive power compensation devices are known, and the present reactive power compensation device may be any one or combination of such devices, such as a Static VAR compensator (SVC), a Static VAR Generator (SVG) device, or a Static Synchronous Compensator (STATCOM) device.

It should be understood that the methods and systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine according to the present disclosure;

FIG. 2 illustrates a schematic view of an embodiment of a wind turbine DFIG system for use with the wind turbine shown in FIG. 1;

FIG. 3 is a schematic diagram of one embodiment of a power converter of a wind turbine according to the present disclosure;

FIG. 4 is a schematic diagram depicting real and reactive power flow in a wind turbine DFIG system with an integrated reactive power compensation device in accordance with aspects of the present disclosure;

FIG. 5 is a diagram of a DFIG wind turbine power in accordance with aspects of the present disclosure;

FIG. 6 is a partial illustration of a wind tower depicting electronic components at a down-tower location within the in accordance with aspects of the present disclosure;

FIG. 7 is a schematic diagram depicting an embodiment of a cooling system configured between the power converter and the reactive power compensation device; and FIG. 8 is a schematic diagram depicting an alternate embodiment of a cooling system configured between the power converter and the reactive power compensation device in accordance with aspects of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As discussed above, in general, the present subject matter is directed to a wind turbine system that supplies real and reactive power to a grid, wherein the wind turbine system includes a tower, and a generator within a nacelle configured atop the tower. A power converter is configured at a down-tower location within the tower (e.g. at or near ground level within the tower). A dedicated (i.e., individual to the wind turbine system) reactive power compensation device is also configured at the down-tower location within the tower, wherein the reactive power compensation device is operably configured with the power converter to provide reactive power in combination with reactive power generated by the power converter.

Although not limited to such configurations, for sake of explanation, the present method and system aspects of the invention are described herein with reference to a wind turbine power generating system, and more particularly to a wind turbine DFIG system that supplies real and reactive power to a grid.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power (P) and reactive power (Q) are provided by each wind turbine generator 120. In some embodiments, a farm-level controller 177 (FIG. 2) provides reactive power commands (Qcmd) to the wind turbine generators 120, based on transmission grid needs (which may be dictated by the grid operator or determined based on grid voltage). The (Qcmd) demand may be identical for each wind turbine generator. In an alternate control methodology, the reactive power commands may be individually tailored to the wind turbine generators 120 in the wind farm based on the different power generation characteristics of the respective wind turbine generators 120, as described, for example in US Pat. Pub. No. 2015/0295529. It should be appreciated that the present invention is not limited to the manner or methodology in which the reactive power command for an individual wind turbine generator 120 is generated.

Referring now to FIG. 2, a schematic diagram of one embodiment of a wind turbine DFIG power system 100 ("wind turbine system") is illustrated in accordance with aspects of the present subject matter. Although the present subject matter will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gear box 118, which is, in turn, coupled to the generator 120, which may be a doubly fed induction generator (DFIG).

As shown, the DFIG 120 is connected to a stator bus 154. A power converter is connected to the DFIG 120 via a rotor bus 156, and to the stator bus 154 via a line side bus 188. The stator bus 154 provides an output multiphase power (e.g. three-phase power) from a stator of the DFIG 120, and the rotor bus 156 provides an output multiphase power (e.g. three-phase power) from a rotor of the DFIG 120. The power converter 162 includes a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 is coupled to a converter controller 174 in order to control the operation of the rotor side converter 166 and the line side converter 168. It should be noted that the converter controller 174 may be configured as an interface between the power converter 162 and a local wind turbine controller (control system) 176 and include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

As mentioned, for an individual DFIG wind turbine power system 100, the reactive power is supplied primarily by the RSC, via the generator 120 and the LSC.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed conditions or operating characteristics of the wind turbine power system 100, and provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at or near its synchronous speed). Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at hub 20 and blades 22. Therefore, mechanical and electrical rotor frequencies are decoupled and the electrical stator and rotor frequency matching is facilitated substantially independently of the mechanical rotor speed.

Under some conditions, the bi-directional characteristics of the power converter 162, and specifically, the bi-directional characteristics of the LSC 168 and RSC 166, facilitate feeding back at least some of the generated electrical power into generator rotor. More specifically, electrical power is transmitted from the stator bus 154 to line side bus 188 and subsequently through the line contactor 172 and into the power converter 162, specifically the LSC 168 which acts as a rectifier and rectifies the sinusoidal, three-phase AC power to DC power. The DC power is transmitted into DC link 136. Capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power with pre-determined voltages, currents, and frequencies. This conversion is monitored and controlled via converter controller 174. The converted AC power is transmitted from RSC 166 via rotor bus 156 to the generator rotor. In this manner, generator reactive power control is facilitated by controlling rotor current and voltage.

Referring now to FIG. 3, a schematic diagram of one embodiment of the power converter shown in FIG. 2 is illustrated in accordance with aspects of the present subject matter. As shown, the rotor side converter (RSC) 166 includes a plurality of bridge circuits (e.g. H-bridge circuits), with each phase of the rotor bus 156 input to the rotor side converter 166 being coupled to a single bridge circuit. In addition, the line side converter (LSC) 168 may also include a plurality of bridge circuits. Similar to the rotor side converter 166, the line side converter 168 also includes a single bridge circuit for each output phase of the line converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

FIG. 4 depicts real and reactive power flow in a wind turbine power system 100 configured with a DFIG system 102. As understood in the art, the primary source of reactive power in the DFIG system is from the RSC 168 via the generator 102 (generator stator-side reactive power (Qs)) and the LSC 168 (generator line-side reactive power (Ql)). A harmonic distortion filter 175 is configured in the line side bus. Use of the power converter 162, in particular the RSC 166, to control the rotor current makes it is possible to adjust the total reactive power (Qwtg) of the system 100 fed to the grid from the RSC 166 independently of the rotational speed of the generator 102. In addition, the DFIG generator 102 is able to import or export reactive power, which allows the system to support the grid during extreme voltage fluctuations on the grid.

Still referring to FIG. 4, the wind turbine power system 100 includes a dedicated reactive power compensation device 200 (also referred to herein as a modular VAR Box (MVB)) that generates an auxiliary reactive power (Qmvb). In the depicted embodiment, the reactive power compensation device 200 is connected to the line side bus (with a different harmonic distortion filter 175) such that (Qmvb) combines with (Ql) on the line side bus as (Q), wherein (Q) and (Qs) are combined at the three-way transformer 202. Thus, total reactive power (Qwtg) from the wind turbine power system 100 is:

$(Qwtg)=(Qs)+(Q)$, wherein $(Q)=(Ql)+(Qmvb)$

Total reactive power (Qwtg) and total real power (Pwtg) are delivered from the transformer 202 to the grid.

The maximum reactive power capacities for (Qmvb), (Qs), and (Ql) are determined in real-time based on any one or combination of: power system operating state; ambient temperature; or thermal constraints of the generator; power converter, or reactive power compensation device. The values for (Qmvb), (Qs), and (Ql) may be continuously or periodically determined and updated in the control system.

The reactive power compensation device 200 may be any one or combination of a Static VAR compensator (SVC), a Static VAR Generator (SVG) device, or a Static Synchronous Compensator (STATCOM) device.

FIG. 5 is a diagram of an embodiment of the wind turbine power system 100 wherein the MVB 200 is integrated with the power converter 162. This system 100 includes a controller 206 that is common to the power converter 162 (e.g., the LSC 168) and the reactive power compensation device 200. Thus, with this embodiment, the LSC 168 and the MVB may share common control wiring/cables and controller, and a separate controller (and related structure) is not needed for the MVB 200.

Still referring to the embodiment of FIG. 5, the wind turbine power system 100 may also include a cooling system 210 that is common to the power converter 162 and the MVB 200. Thus, with this embodiment, a separate cooling system is not needed for the MVB 200. Embodiments of the cooling system 210 will be described below.

Referring to FIG. 6, a down-tower location 226 is depicted within the wind turbine tower 12. As in generally understood in the art, the "down-tower" location is at or near the ground level within the tower 12 where the electronic control cabinets are located in many designs, including the power converter 162 and controller 174. With various conventional wind turbine systems 100, a cooling system 210 is configured to deliver a cooling medium (e.g. air or liquid) to the electronic components to maintain the components within an acceptable operating temperature range. The MVB 200 may also located at the down-tower location 226 in proximity to the power converter 162 and is also cooled by the same cooling system 210. In this embodiment, the power converter controller 174 is configured with a LSC controller 206 and a RSC controller 208. A control line 224 connects the LSC controller 206 with the MVB 200 so that the MVB is also controlled by the LSC controller 206.

In other embodiments, the MVB 200 and control electronics (including the power converter 162 and cooling system 210) may be located at any location within the tower 12, such as an up-tower location that is closer to the nacelle 16 or any other location between a down-tower and up-tower location.

In the depicted embodiment of FIG. 5 wherein the generator is a DFIG system, the reactive power compensation device 200 may be connected with the LSC 168 at a connection point 204 on a bus, such as the line-side bus 188. Thus, both the LSC 168 and the MVB 200 are commonly connected to the same three-way transformer 202. The MVB may include its own DC link 203.

Referring to FIGS. 2 and 5, the wind turbine system 100 includes a main breaker 182 in the system bus 160 that isolates the system 100 from the grid 184. As seen in FIG. 5, the MVB 200 is on the same side of the main breaker 182 as the power converter 162. Thus, the same breaker 182 provides protection to the DFIG system and the MVB 200.

It should be appreciated that the cooling system 210 may be variously configured within the scope and spirit of the invention to provide a cooling functionality to the various electronic components, including the power converter 162, controller 174, and MVB 200. For example, various configurations of an open-loop or closed-loop cooling system may be utilized, wherein a cooling medium 212 (e.g., air, gas, or liquid) is used to provide the cooling effect. FIG. 7 depicts an embodiment wherein the cooling system 210 includes a heat exchanger 214 that is common to the MVB 200 and the power converter 162. For example, a first closed loop cooling path 220 may circulate the cooling medium 212 between the MVB 200 and the heat exchanger 214 with the aid of motive device 216 (which may be a fan as depicted in the figures for a gaseous/air cooling medium or a pump for a liquid cooling medium). A separate, second closed loop cooling path 222 may circulate the cooling medium 212 between the same heat exchanger 214 and the LSC 168 and LSC controller 206 with the aid of a second motive device 217. The second closed loop cooling path 222 may include the RSC 166 and RSC controller 208, as depicted in FIG. 7

FIG. 8 depicts an embodiment wherein the MVB 200 is configured adjacent the power converter 162, for example, adjacent to the LSC 168. A single closed-loop cooling path 218 is established between the heat exchanger 214 and the MVB 200 and power converter 162, particularly the LSC 168 and LSC controller 206, with the LSC controller being common to the MVB 200. The cooling path 218 may also include the RSC 166 and the RSC controller 208.

Various aspects and embodiments of the present invention are defined by the following numbered clauses:

1. A wind turbine system configured to supply real and reactive power to a grid, comprising:
    a tower;
    a generator within a nacelle configured atop the tower, the generator connected to a rotor, the rotor connected to a hub comprising a plurality of turbine blades mounted thereon;
    a power converter configured at a location within the tower; and
    a reactive power compensation device configured at the location within the tower, the reactive power compensation device operably configured with the power converter so as to provide reactive power in combination with reactive power generated by the power converter.

2. The wind turbine system as in clause 1, further comprising a controller, the controller common to the power converter and the reactive power compensation device.

3. The wind turbine system as in any preceding clause, further comprising a cooling system, the cooling system common to the power converter and the reactive power compensation device.

4. The wind turbine system as in any preceding clause, further comprising a controller, the controller common to the power converter and the reactive power compensation device.

5. The wind turbine system as in any preceding clause, wherein the generator comprises a doubly fed induction generator (DFIG), the power converter comprising a line side converter (LSC) and a rotor side converter (RSC), wherein the DFIG generates a generator stator-side reactive power (Qs) and the LSC generates a generator line-side reactive power (Ql), wherein the reactive power compensation device generates reactive power (Qmvb) that combines with (Ql) such that a total reactive power generated by the wind turbine system (Qwtg) is a total of (Qs), (Ql), and (Qmvb).

6. The wind turbine system as in any preceding clause, wherein the reactive power compensation device is connected with the LSC at a connection point on a line-side bus.

7. The wind turbine system as in any preceding clause, further comprising a system bus that connects the DFIG to the grid, and a main breaker in the system bus, the compensation device and the power converter on a common side of the main breaker.

8. The wind turbine system as in any preceding clause, further comprising a power converter controller having a LSC controller and a RSC controller, the LSC controller configured with the reactive power compensation device to control the operation thereof.

9. The wind turbine system as in any preceding clause, further comprising a cooling system configured to provide a cooling medium to the power converter and the reactive power compensation device.

10. The wind turbine system as in any preceding clause, wherein the cooling system comprises a heat exchanger, the reactive power compensation device and the LSC arranged in a common closed-loop cooling path with the heat exchanger.

11. The wind turbine system as in any preceding clause, wherein the RSC is also arranged in the closed-loop cooling path.

12. The wind turbine system as in any preceding clause, wherein the reactive power compensation device is arranged in a first closed-loop cooling path with the heat exchanger, and the LSC is arranged in a separate, second closed-loop cooling path.

13. The wind turbine system as in any preceding clause, wherein the RSC is also arranged in the second closed-loop cooling path.

14. The wind turbine system as in any preceding clause, wherein the reactive power compensation device comprises any one or combination of a Static VAR compensator (SVC), a Static VAR Generator (SVG) device, or a Static Synchronous Compensator (STATCOM) device.

15. The wind turbine system as in any preceding clause, wherein the power converter and the reactive power compensation device are configured at a common side of a main breaker that connects the generator to the grid.

16. A wind turbine system configured to supply real and reactive power to a grid, comprising:
    a tower;
    a generator within a nacelle configured atop the tower, the generator connected to a rotor, the rotor connected to a hub comprising a plurality of turbine blades mounted thereon;
    a power converter configured at a location within the tower; the generator comprising a doubly fed induction generator (DFIG), the power
    converter comprising a line side converter (LSC) and a rotor side converter (RSC);
    a reactive power compensation device configured at the location within the tower, the reactive power compensation device operably configured with the power converter so as to provide reactive power in combination with reactive power generated by the power converter;

a controller, the controller common to the power converter and the reactive power compensation device; and a cooling system, the cooling system common to the power converter and the reactive power compensation device.

17. The wind turbine system as in clause 16, wherein the reactive power compensation device is connected with the LSC at a connection point on a rotor-side bus.

18. The wind turbine system as in any one of clauses 16-17, further comprising a power converter controller having a LSC controller and a RSC controller, the LSC controller configured with the reactive power compensation device to control the operation thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine system configured to supply real and reactive power to a grid, comprising:
   a tower;
   a generator within a nacelle configured atop the tower, the generator connected to a rotor, the rotor connected to a hub comprising a plurality of turbine blades mounted thereon;
   a power converter configured at a location within the tower;
   a reactive power compensation device dedicated to the wind turbine system and configured at the location within the tower, the reactive power compensation device operably configured with the power converter so as to provide additional reactive power from the wind turbine system in combination with reactive power generated by the power converter; and
   wherein the power converter and the reactive power compensation device are configured at a common side of a main breaker that connects the generator to the grid.

2. The wind turbine system as in claim 1, further comprising a controller, the controller common to the power converter and the reactive power compensation device.

3. The wind turbine system as in claim 1, further comprising a cooling system, the cooling system common to the power converter and the reactive power compensation device.

4. The wind turbine system as in claim 3, further comprising a controller, the controller common to the power converter and the reactive power compensation device.

5. The wind turbine system as in claim 1, wherein the reactive power compensation device comprises any one or combination of a Static VAR compensator (SVC), a Static VAR Generator (SVG) device, or a Static Synchronous Compensator (STATCOM) device.

6. A wind turbine system configured to supply real and reactive power to a grid, comprising:
   a tower;
   a generator within a nacelle configured atop the tower, the generator connected to a rotor, the rotor connected to a hub comprising a plurality of turbine blades mounted thereon;
   a power converter configured at a location within the tower;
   a reactive power compensation device configured at the location within the tower, the reactive power compensation device operably configured with the power converter so as to provide reactive power in combination with reactive power generated by the power converter; and
   wherein the generator comprises a doubly fed induction generator (DFIG), the power converter comprising a line side converter (LSC) and a rotor side converter (RSC), wherein the DFIG generates a generator stator-side reactive power (Qs) and the LSC generates a generator line-side reactive power (Ql), wherein the reactive power compensation device generates reactive power (Qmvb) that combines with (Ql) such that a total reactive power generated by the wind turbine system (Qwtg) is a total of (Qs), (Ql), and (Qmvb).

7. The wind turbine system as in claim 6, wherein the reactive power compensation device is connected with the LSC at a connection point on a line-side bus.

8. The wind turbine system as in claim 7, further comprising a system bus that connects the DFIG to the grid, and a main breaker in the system bus, the compensation device and the power converter on a common side of the main breaker.

9. A wind turbine system configured to supply real and reactive power to a grid, comprising:
   a tower;
   a generator within a nacelle configured atop the tower, the generator connected to a rotor, the rotor connected to a hub comprising a plurality of turbine blades mounted thereon;
   a power converter configured at a location within the tower;
   the generator comprising a doubly fed induction generator (DFIG), the power converter comprising a line side converter (LSC) and a rotor side converter (RSC);
   a reactive power compensation device dedicated to the wind turbine system and configured at the location within the tower, the reactive power compensation device operably configured with the power converter so as to provide additional reactive power from the wind turbine system in combination with reactive power generated by the power converter;
   the power converter and the reactive power compensation device configured at a common side of a main breaker that connects the generator to the grid;
   a controller, the controller common to the power converter and the reactive power compensation device; and
   a cooling system, the cooling system common to the power converter and the reactive power compensation device.

10. A wind turbine system configured to supply real and reactive power to a grid, comprising:
    a tower;
    a generator within a nacelle configured atop the tower, the generator connected to a rotor, the rotor connected to a hub comprising a plurality of turbine blades mounted thereon;
    a power converter configured at a location within the tower;

the generator comprising a doubly fed induction generator (DFIG), the power converter comprising a line side converter (LSC) and a rotor side converter (RSC);

a reactive power compensation device dedicated to the wind turbine system and configured at the location within the tower, the reactive power compensation device operably configured with the power converter so as to provide additional reactive power from the wind turbine system in combination with reactive power generated by the power converter;

a controller, the controller common to the power converter and the reactive power compensation device;

a cooling system, the cooling system common to the power converter and the reactive power compensation device; and wherein the reactive power compensation device is connected with the LSC at a connection point on a rotor-side bus.

* * * * *